US009971710B2

(12) United States Patent
Agarwal et al.

(10) Patent No.: US 9,971,710 B2
(45) Date of Patent: May 15, 2018

(54) OPTIMIZING DATA TRANSFERS BETWEEN HETEROGENEOUS MEMORY ARENAS (71) Applicant: Microsoft Technology Licensing, LLC, Redmond, WA (US)

(72) Inventors: Amit Kumar Agarwal, Redmond, WA (US); Yosseff Levanoni, Redmond, WA (US); Weirong Zhu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 13/761,882

(22) Filed: Feb. 7, 2013

(65) Prior Publication Data

US 2014/0223131 A1    Aug. 7, 2014

(51) Int. Cl.
G06F 12/00 (2006.01)
G06F 13/16 (2006.01)
G06F 3/06 (2006.01)
G09G 5/00 (2006.01)
G09G 5/39 (2006.01)

(52) U.S. Cl.
CPC ........ G06F 13/1615 (2013.01); G06F 3/0647 (2013.01); G09G 5/001 (2013.01); G09G 5/39 (2013.01); G09G 2360/127 (2013.01)

(58) Field of Classification Search
None
See application file for complete search history.

(56) References Cited

U.S. PATENT DOCUMENTS

| 5,388,219 | A | 2/1995 | Chan et al. | |
| 7,755,631 | B1 * | 7/2010 | Mrazek et al. | 345/501 |
| 8,730,248 | B2 * | 5/2014 | Sasaki et al. | 345/503 |
| 2008/0012874 | A1 * | 1/2008 | Spangler et al. | 345/582 |
| 2008/0303833 | A1 * | 12/2008 | Swift et al. | 345/505 |
| 2009/0202173 | A1 | 8/2009 | Weiss et al. | |

(Continued)

OTHER PUBLICATIONS

Jenkins, et al., "Enabling Fast, Noncontiguous GPU Data Movement in Hybrid MPI+GPU Environments", in Proceedings of IEEE International Conference on Cluster Computing (Cluster), Beijing, China, Sep. 24, 2012, 12 pages.

(Continued)

Primary Examiner — Reginald Bragdon
Assistant Examiner — Michael Westbrook
(74) Attorney, Agent, or Firm — Workman Nydegger (57) ABSTRACT Embodiments are directed to optimizing data transfers between heterogeneous memory arenas. In one scenario, a computer system receives an indication that a data chunk is to be transferred from a first memory arena to a third memory arena, and then determines that for the data chunk to be transferred from the first memory arena to the third arena, the data chunk is to be transferred from the first memory arena to a second memory arena, and from the second memory arena to the third memory arena. The computer system divides the data chunk into smaller data portions and copies a first data portion from the first memory arena to the second memory arena. The computer system then copies the first data portion from the second memory arena to the third memory arena and copies a second data portion from the first memory arena to the second memory arena in parallel.

20 Claims, 5 Drawing Sheets (56) References Cited

U.S. PATENT DOCUMENTS

| | | | |
|---|---|---|---|
| 2010/0161936 A1 | 6/2010 | Royer et al. | |
| 2013/0179485 A1* | 7/2013 | Chapman et al. | 709/201 |
| 2013/0318300 A1* | 11/2013 | Agrawal et al. | 711/118 |

OTHER PUBLICATIONS

Che, et al., "Dymaxion: Optimizing Memory Access Patterns for Heterogeneous Systems", in Proceedings of 2011 International Conference for High Performance Computing, Networking, Storage and Analysis, Nov. 12, 2011, 11 pages.

Visschers, Paul, "Reducing the overhead of data transfer in data-parallel programs", in a Master thesis, Mar. 28, 2012, 77 pages.

Wang, et al., "Optimized Non-contiguous MPI Datatype Communication for GPU Clusters: Design, Implementation and Evaluation with MVAPICH2", in Proceedings of IEEE International Conference on Cluster Computing (CLUSTER), Sep. 26, 2011, 9 pages.

Wu, et al., "Optimizing Data Warehousing Applications for GPUs Using Kernel Fusion/Fission", in Multicore and GPU Programming Models, Languages and Compilers Workshop with IEEE 26th International on Parallel and Distributed Processing Symposium Workshops & PhD Forum (IPDPSW), May 21, 2012, 10 pages.

"Techniques to Reduce CPU to GPU Data Transfer Latency", Retrieved on: Nov. 21, 2012, Available at: http://stackoverflow.com/questions/6500905/techniques-to-reduce-cpu-to-gpu-data-transfer-latency.

https://www.khronos.org/registry/cl/specs/opencl-1.1.pdf Aaftab Munshi, The OpenCL Specification, Version 1.1 Document Revision: 44, Last Revision date: Jun. 1, 2011, (385 pages) Retrieved on: Apr. 28, 2015.

https://www.khronos.org/registry/cl/specs/opencl-1.0.pdf Aaftab Munshi, The OpenCL Specification, Version 1.0 Document Revision: 48, Last Revision date: Oct. 6, 2009, (308 pages) Retrieved on: Apr. 28, 2015.

https://web.archive.org/web/20130117180627/http://www.khronos.org/registry/cl/Khronos OpenCL API Registry, Retrieved on: Apr. 29, 2015.

* cited by examiner

OPTIMIZING DATA TRANSFERS BETWEEN HETEROGENEOUS MEMORY ARENAS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Computer systems include many different hardware components. Some of these components include memory arenas. Memory arenas include hardware memory components (or portions thereof) that are accessible by other components. For example, a central processing unit (CPU) may include multiple memory arenas, some of which are accessible by a graphics processing unit (GPU). A GPU itself may also have various memory arenas, some of which may be accessible by the CPU. Thus, when transferring data between CPU and GPU memory arenas, data may need to be first transferred to a memory arena that is accessible by the other component. Such data transfers may be resource intensive.

BRIEF SUMMARY

Embodiments described herein are directed to optimizing data transfers between heterogeneous memory arenas. In one embodiment, a computer system receives an indication that a chunk of data is to be transferred from a first memory arena to a third memory arena. The computer system also determines that for the data chunk to be transferred from the first memory arena to the third arena, the data chunk is to be transferred from the first memory arena to a second memory arena, and from the second memory arena to the third memory arena. The computer system divides the data chunk into multiple different smaller data portions and copies a first data portion from the first memory arena to the second memory arena. The computer system then performs the following in parallel to optimize data transfers between memory arenas: copies the first data portion from the second memory arena to the third memory arena and copies a second data portion from the first memory arena to the second memory arena. It should be noted that this technique for optimizing data transfers between heterogeneous memory arenas technique extends to transfers that use multiple intermediate memory arenas. In such cases, each of the intermediate steps may be performed in parallel by applying pipelining at each of the intermediate processing resources.

In another, more specific embodiment, a computer system receives an indication that a chunk of data is to be transferred from a central processing unit (CPU) memory arena to a graphics processing unit (GPU) memory arena. The computer system then determines that for the data chunk to be transferred from the CPU memory arena to the GPU memory arena, the data chunk is to be transferred from a first CPU memory arena to a second CPU memory arena, and from the second CPU memory arena to the GPU memory arena. In response, the computer system divides the data chunk into a plurality of smaller data portions, copies a first data portion from the first CPU memory arena to the second CPU memory arena, and performs the following in parallel: copies the first data portion from the second CPU memory arena to the GPU memory arena and copies a second data portion from the first CPU memory arena to the second CPU memory arena.

In yet another embodiment, a computer system receives an indication that a chunk of data is to be transferred from a first GPU memory arena to a second GPU memory arena and determines that for the data chunk to be transferred from the first GPU memory arena to the second GPU memory arena, the data chunk is to be transferred from the first GPU memory arena to a central processing unit (CPU) memory arena, and from the CPU memory arena to the second GPU memory arena. The computer system divides the data chunk into a plurality of smaller data portions, copies a first data portion from the first GPU memory arena to the CPU memory arena, and performs the following in parallel: copies the first data portion from the CPU memory arena to the second GPU memory arena and copies a second data portion from the first GPU memory arena to the CPU memory arena.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to optimizing data transfers between heterogeneous memory arenas. In one embodiment, a computer system receives an indication that a chunk of data is to be transferred from a first memory arena to a third memory arena. The computer system also determines that for the data chunk to be transferred from the first memory arena to the third arena, the data chunk is to be transferred from the first memory arena to a second memory arena, and from the second memory arena to the third memory arena. The computer system divides the data chunk into multiple different smaller data portions and copies a first data portion from the first memory arena to the second memory arena. The computer system then performs the following in parallel to optimize data transfers between memory arenas: copies the first data portion from the second memory arena to the third memory arena and copies a second data portion from the first memory arena to the second memory arena.

In another, more specific embodiment, a computer system receives an indication that a chunk of data is to be transferred from a central processing unit (CPU) memory arena to a graphics processing unit (GPU) memory arena. The computer system then determines that for the data chunk to be transferred from the CPU memory arena to the GPU memory arena, the data chunk is to be transferred from a first CPU memory arena to a second CPU memory arena, and from the second CPU memory arena to the GPU memory arena. In response, the computer system divides the data chunk into a plurality of smaller data portions, copies a first data portion from the first CPU memory arena to the second CPU memory arena, and performs the following in parallel: copies the first data portion from the second CPU memory arena to the GPU memory arena and copies a second data portion from the first CPU memory arena to the second CPU memory arena.

In yet another embodiment, a computer system receives an indication that a chunk of data is to be transferred from a first GPU memory arena to a second GPU memory arena and determines that for the data chunk to be transferred from the first GPU memory arena to the second GPU memory arena, the data chunk is to be transferred from the first GPU memory arena to a central processing unit (CPU) memory arena, and from the CPU memory arena to the second GPU memory arena. The computer system divides the data chunk into a plurality of smaller data portions, copies a first data portion from the first GPU memory arena to the CPU memory arena, and performs the following in parallel: copies the first data portion from the CPU memory arena to the second GPU memory arena and copies a second data portion from the first GPU memory arena to the CPU memory arena.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
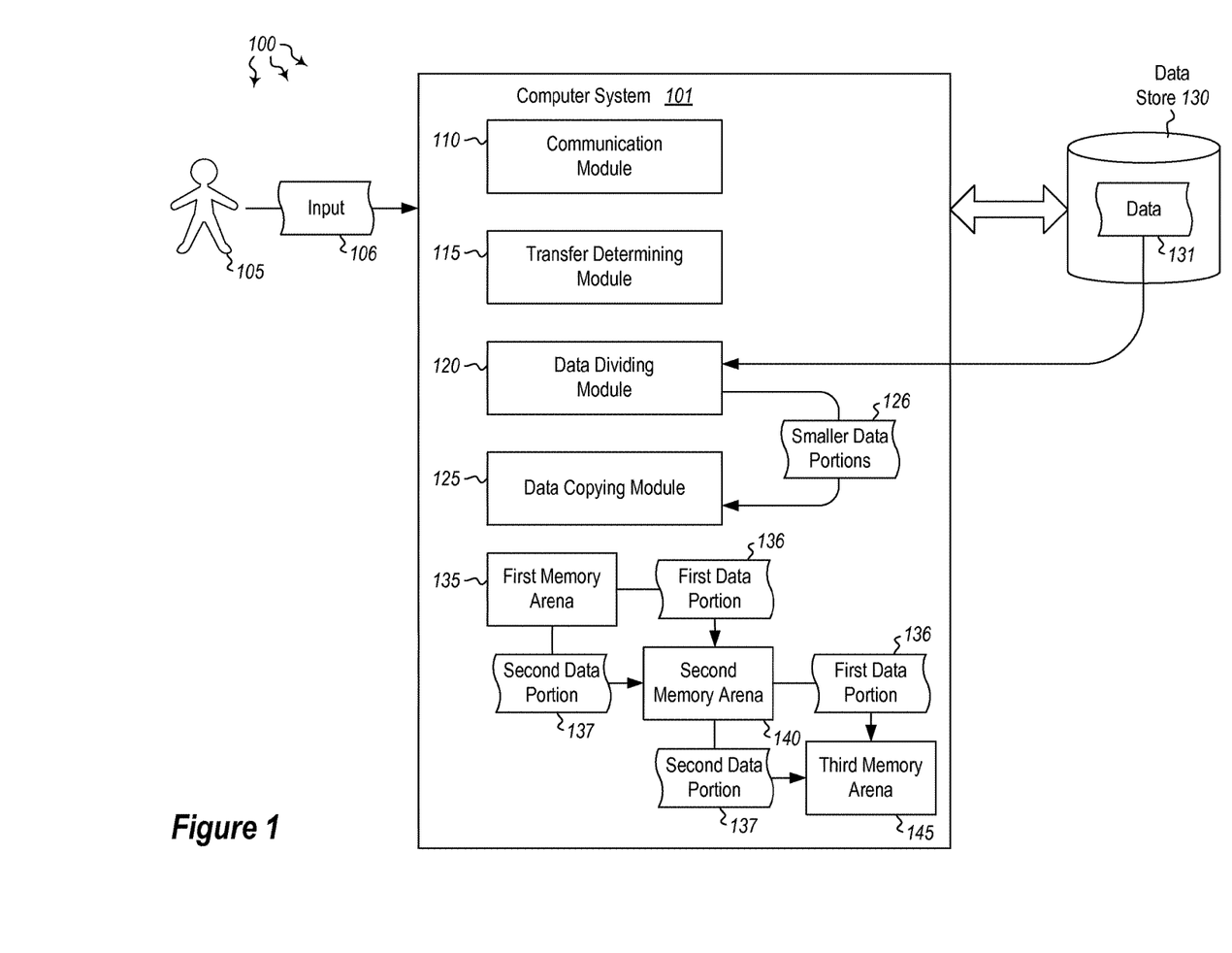
FIG. 1 illustrates a computer architecture in which embodiments described herein may operate including optimizing data transfers between heterogeneous memory arenas.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, the communications module 110 may receive and send communications to and from the user 105. The communications may include input 106, which may indicate, for example, that data is to be transferred from one memory arena to another. As used herein, the term "memory arena" refers to a hardware or virtual portion of memory. The memory arena may be part of a central processing unit (CPU), graphics processing unit (GPU) or other hardware component. The memory arena may also include or be part of accelerator memory.

In some cases, data is to be transferred between memory arenas (e.g. between first memory arena 135 and second memory arena 140, or between first, second and third memory arenas). In such cases, the data transfer may involve multiple different copying or other data transfer steps. Some or all of the steps in the transfer process may be dependent on the previous step. For example, transferring data between two GPUs may include two steps: copying the data from the source GPU to a CPU, and then copy from the CPU to the destination GPU.

When data is copied between CPU and GPU memory, a GPU direct memory access (DMA) copy engine may be used. The GPU DMA copy engine may indicate that the CPU's memory to be properly aligned before data can be transferred. In such cases, data transfers may involve an extra step of copying between the actual CPU source/destination memory and a temporary memory allocation on the CPU that meets the DMA copy engine constraints. Such data transfer operations may result in the overall latency of the data transfer operation being the sum of each step in the process.

In embodiments described herein, the overall transfer operation may be broken into a series of transfers of smaller chunks. Then, the data chunks may be pipelined so that the execution of different steps in the transfer operation overlap by concurrently executing the different steps in the pipeline with each different step being performed on a different chunk of the larger transfer. The pipelining technique may be applied to any data transfer operation that involves multiple steps as part of the transfer operation. The different steps may be performed by any hardware or software resources that can function concurrently.

This pipelining technique may be applied, for example, when copying a large amount of data between the memory arenas of two different accelerator devices. In such cases, the transfer is to be routed through CPU memory, and thus includes two steps: 1) copy data from source accelerator memory to CPU memory, and 2) copy the data from CPU memory to destination accelerator memory. Since step 1 and step 2 in the above transfer operation are performed by independent DMA engines (step 1 by the source accelerator DMA engine and step 2 by the destination accelerator's DMA copy engine), the two engines can work concurrently to speed up the overall transfer time by pipelining the data copying steps.

Figure 5:
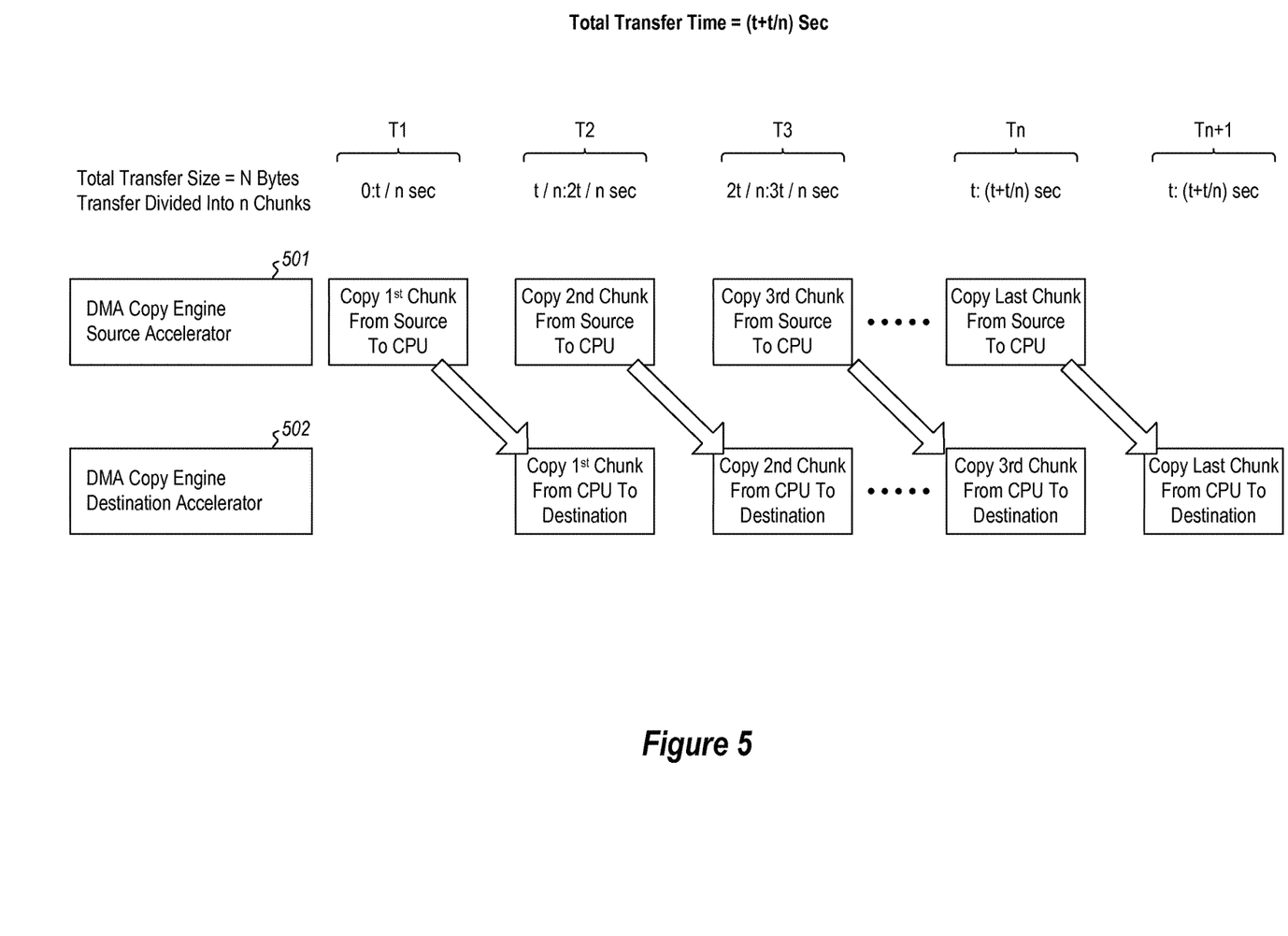
FIG. 5 illustrates a pipelined data transfer between heterogeneous memory arenas.

As can be seen in FIG. 5, the data transfer may be accelerated by having the two DMA engines work concurrently instead of having the second engine wait for the first engine to finish all of its copying. At a given point of time, the first DMA engine is copying the k-th chunk from the source accelerator memory to CPU memory and the second DMA engine is concurrently copying the (k−1)th chunk from the CPU to the destination accelerator. Hence the overall transfer can be completed in (approximately) half of the time it would have taken to perform the copy using a serial approach.

In some cases, the overall increase in copying speed using this pipelining technique depends on the number of steps involved in the transfer operation. In the example above, there were two steps and the overall data transfer speed was approximately two times faster. If there are a total of "m" steps and each of these steps are performed by an independent resource, then the total transfer time can be sped up by ~m times (assuming each step takes the same amount of time to execute). These concepts will be explained further below with regard to methods 200, 300 and 400 of FIGS. 2, 3 and 4, respectively.

Figure 2:
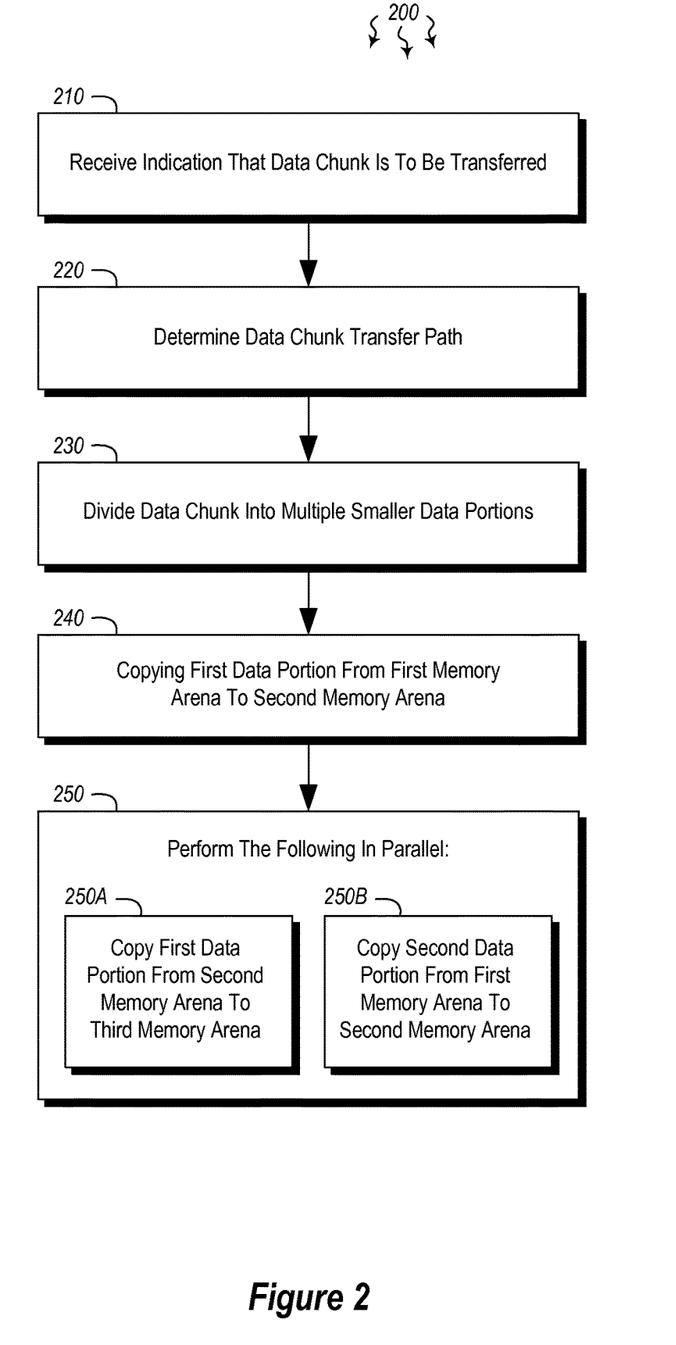
FIG. 2 illustrates a flowchart of an example method for optimizing data transfers between heterogeneous memory arenas.
Figure 3:
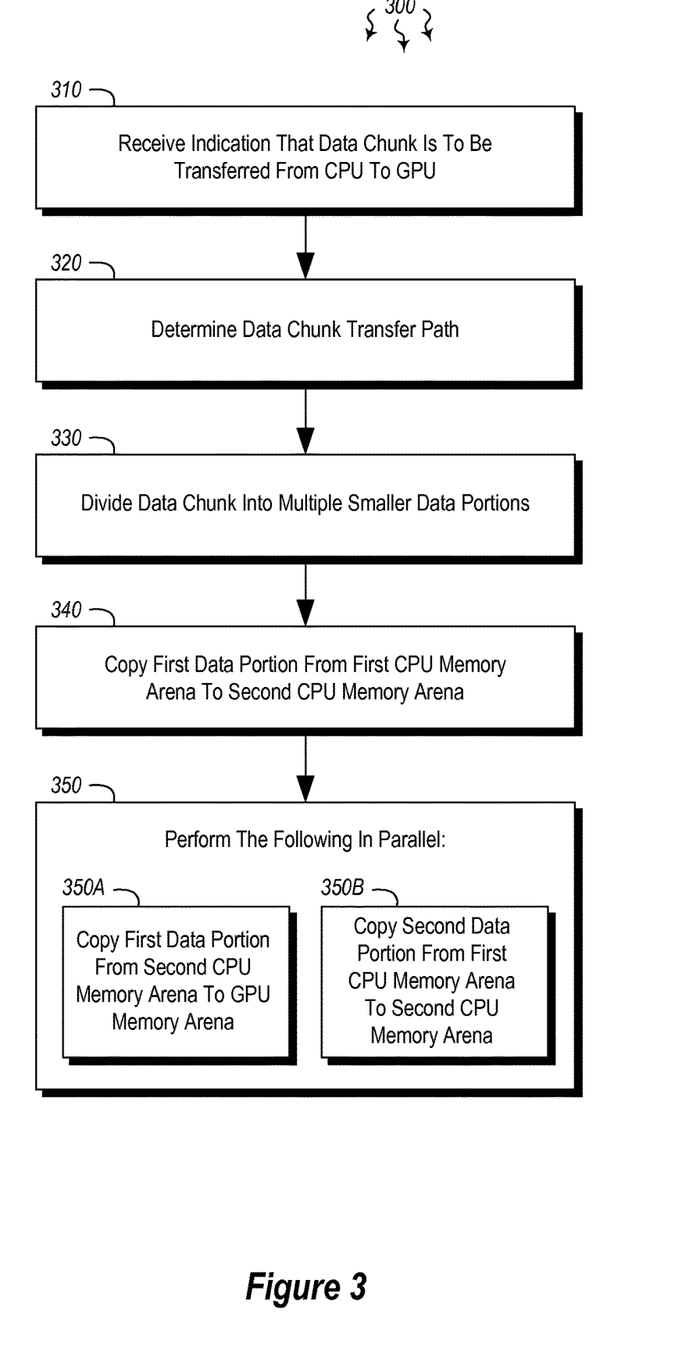
FIG. 3 illustrates a flowchart of an alternative example method for optimizing data transfers between CPU and GPU memory arenas.
Figure 4:
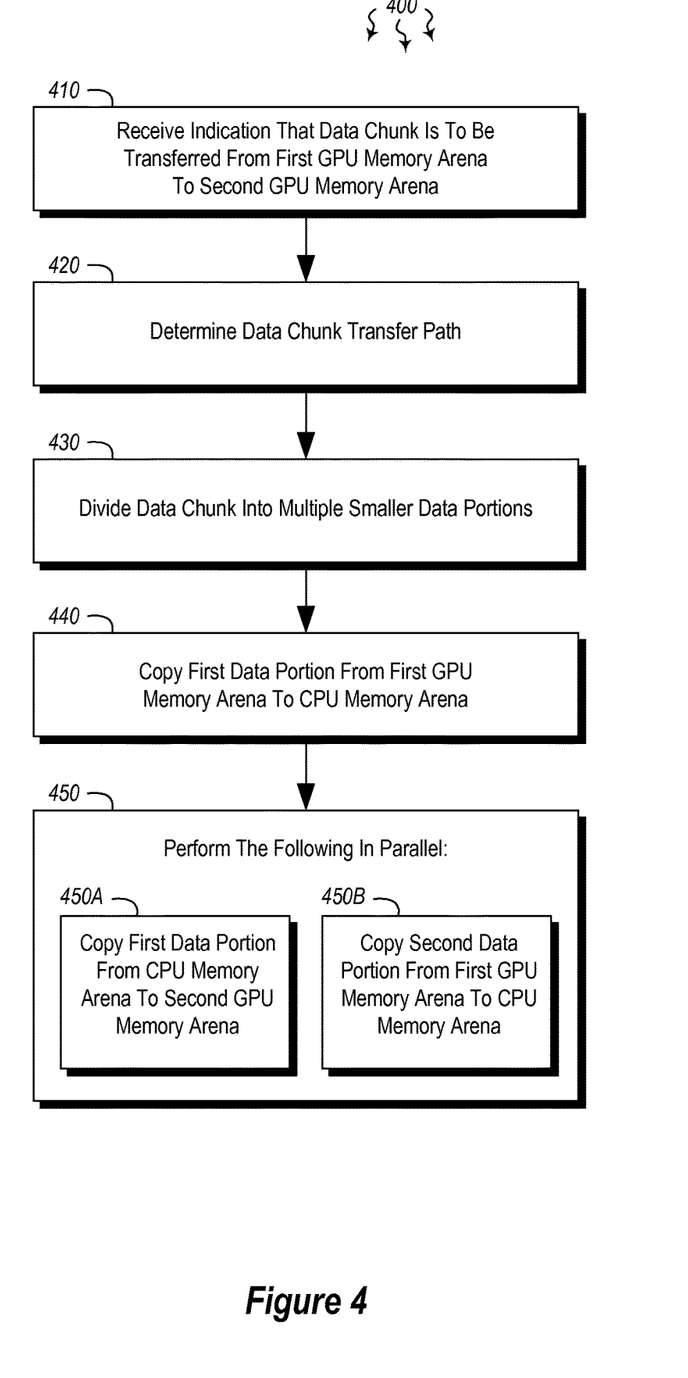
FIG. 4 illustrates a flowchart of an alternative example method for optimizing data transfers between first and second GPU memory arenas.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for optimizing data transfers between heterogeneous memory arenas. The method 200 will now be described with frequent reference to the components and data of environment 100.

Method 200 includes an act of receiving an indication that a chunk of data is to be transferred from a first memory arena to a third memory arena (act 210). For example, communications module 110 may receive input 106 indicating that data chunk 131 is to be transferred from first memory arena 135 to third memory arena 145. As will be described below, the first memory arena 135 may be a first GPU memory arena and the third memory arena 145 may be a second GPU memory arena. The data may need to be transferred through a CPU and, as such, may be transferred through the second memory arena 140. As mentioned above, any of the first-third memory arenas may include accelerator memory, and may be referred to as a direct memory access (DMA) engine.

Method 200 includes an act of determining that for the data chunk to be transferred from the first memory arena to the third arena, the data chunk is to be transferred from the first memory arena to a second memory arena, and from the second memory arena to the third memory arena (act 220). The transfer determining module 115 may determine that, for example, for data to be transferred from one GPU to another GPU, the data is first to be transferred to a CPU (and possibly to multiple memory arenas within the CPU, in cases where the data transferred from the first CPU is copied to a CPU memory arena that is not accessible by the second GPU).

Method 200 further includes an act of dividing the data chunk into a plurality of smaller data portions (act 230). Thus, data dividing module 120 may divide data chunk 131 into multiple smaller data portions 126. Dividing the data chunk 131 into smaller portions may be performed in different ways, depending on the size of the data that is to be transferred and the characteristics of the processing resources involved in the transfer. The primary objective when dividing the data is reducing or minimizing the amount of time needed to transfer the data. As shown in FIG. 4, data chunks may be broken up and transferred between different memory arenas by independent processing resources (e.g. between DMA engines). The data transfer may include some amount of fixed overhead associated with the transfer of each chunk. As such, the overall overhead may increase linearly with the number of chunks that the data transfer is broken into. Thus, while smaller chunk sizes may help reduce the cost of filling the pipeline, the increased number of chunks may increase the overhead associated with overall transfer of the entire data.

One embodiment may be expressed in mathematical terms as defined below: Assume the data transfer operation comprises 2 steps: N=total size of the data to be transferred, n=size of each chunk, B1=transfer bandwidth of the source accelerator DMA copy engine (501), B2=transfer bandwidth of the destination accelerator DMA copy engine (502), O1=fixed overhead (time) for performing a data transfer operation on the source accelerator DMA copy engine (501), and O2=fixed overhead (time) for performing a data transfer operation on the destination accelerator DMA copy engine (502). In this embodiment, the time taken by the source accelerator DMA engine for transferring a chunk would be $$O1 + \frac{n}{B1}.$$

The time taken by the destination accelerator DMA engine for transferring a chunk would be $$O2 + \frac{n}{B2},$$

and the total data transfer time would be $$\min\left(O1 + \frac{n}{B1}, O2 + \frac{n}{B2}\right) + \frac{N}{n} * \max\left(O1 + \frac{n}{B1}, O2 + \frac{n}{B2}\right).$$

For a given data transfer size, and a source and destination accelerator in the above embodiment, the only variable in the above equation is "n"—the size of each chunk. Hence for a given data transfer operation, the value of "n" may be chosen to minimize the overall time required for the data transfer. Though the above example is in context of a two-step transfer for the purpose of illustration, the same general approach is employed for choosing an appropriate chunk size, irrespective of the number of intermediate steps and processing resources involved in the data transfer operation.

These smaller data portions may be sent to the data copying module 125 and copied from one memory arena to another. The data copying module may copy a first data portion 136 from the first memory arena 135 to the second memory arena 140 (act 240). Then, method 200 includes an act of performing the following in parallel (act 250): copying the first data portion from the second memory arena 140 to the third memory arena 145 (act 250A), and copying a second data portion 137 from the first memory arena 135 to the second memory arena 140 (act 250B). As such, after the first data portion is copied from the first memory arena to the second memory arena, the transfer of subsequent data chunks (e.g. from first to second, and from second to third) is performed in parallel.

In some embodiments, the first memory arena 135 may be a source accelerator memory arena, the second memory arena may be a CPU memory arena, and the third memory arena may be a destination accelerator memory arena. In such cases, the data portions are transferred from the source accelerator memory (e.g. first memory arena 135) to the CPU (e.g. second memory arena 140) and then to the destination accelerator memory (e.g. third memory arena 145). The parallel acts of copying the first data portion from the second memory arena to the third memory arena and copying the second data portion from the first memory arena to the second memory arena may each be performed by independent direct memory access (DMA) engines. As such, DMA engines can use the techniques described herein to quickly transfer data in a heterogeneous environment.

In one example, an accelerator DMA engine copies the first data portion 136 from the second memory arena 140 to the third memory arena 145, and a destination accelerator copies the second data portion 137 from the first memory arena to the second memory arena. In this example, once the first portion of data has been transferred, each subsequent portion is processed by the independent source and destination DMA engines concurrently.

In some cases, data may be transferred between a first memory arena and a fourth memory arena. In such cases, transfer determining module 115 may determine that for the data 131 to be transferred from the first memory arena to a fourth arena, the data chunk is to be transferred from the first memory arena to a second memory arena, from a second memory arena to a third memory arena, and from the third memory arena to the fourth memory arena. In response to the determination, the data copying module 125 may perform the following in parallel: copy a third data portion (not shown) from the first memory arena 135 to the second memory arena 140, copy the second data portion 137 from the second memory arena to the third memory arena 145 and copy the first data portion 136 from the third memory arena to the fourth memory arena. As shown in FIG. 5, the total transfer time for such a data transfer is t+t/n seconds, where n is the number of data portions (i.e. chunks). The copying is performed concurrently at each stage, once the pipeline is loaded. This concurrent data transfer among heterogeneous memory arenas allows data to be quickly transferred and accessed by the destination. Instead of serially sending a large data chunk from arena to arena, the chunks are broken down into smaller pieces and transferred concurrently, thus greatly reducing transfer time.

FIG. 3 illustrates a flowchart of a method 300 for optimizing data transfers between heterogeneous memory arenas. The method 300 will now be described with frequent reference to the components and data of environment 100.

Method 300 includes an act of receiving an indication that a chunk of data is to be transferred from a central processing unit (CPU) memory arena to a graphics processing unit (GPU) memory arena (act 310). As above, user 105 or another software application or other entity may send an indication to computer system 101 indicating that data chunk 131 (stored in data store 130 (which may be any type of local, remote or distributed data store)) is to be transferred from a CPU memory arena (e.g. first memory arena 135) to a GPU memory arena (e.g. third memory arena 145).

Method 300 then determines that for the data chunk to be transferred from the CPU memory arena to the GPU memory arena, the data chunk is to be transferred from a first CPU memory arena to a second CPU memory arena, and from the second CPU memory arena to the GPU memory arena (act 320). The transfer determining module 115 thus indicates that the data chunk is to be divided into portions and transferred from the first CPU memory arena (e.g. 135) to a second CPU memory arena (e.g. 140), and from the second CPU memory arena to the GPU memory arena (e.g. 145).

Method 300 next divides the data chunk 131 into a plurality of smaller data portions (act 330). These smaller data portions 126 may be substantially any size, and may comprise substantially any number of data portions. The data portions are copied in a pipeline fashion, starting with the first data portion 136 which is copied from the first CPU memory arena 135 to the second CPU memory arena 140 (act 340). Then, the subsequent copying steps are performed in parallel (act 350): copying the first data portion 136 from the second CPU memory arena 140 to the GPU memory arena 145 (act 350A) and copying a second data portion 137 from the first CPU memory arena 135 to the second CPU memory arena 140 (act 350B). This second data portion 137 may then be copied from the second CPU memory arena 140 to the GPU memory arena 140 while a third data portion is copied from the first CPU memory arena 135 to the second CPU memory arena 140, and so on.

In some embodiments, the data chunk 131 may include a data file or a collection or series of data files. In other cases, the data chunk may be a stream of data chunks or portions. The stream of data portions would be divided by module 120 into appropriately sized portions, and transferred from the first CPU memory arena to the second CPU memory arena, and from the second CPU memory arena to the GPU memory arena in the manner described above. Thus, the data transfers between heterogeneous environments may include live or streamed data, or may include regular data files.

FIG. 4 illustrates a flowchart of an alternative method 400 for optimizing data transfers between heterogeneous memory arenas. The method 400 will now be described with frequent reference to the components and data of environment 100.

The communications module 110 of computer system 101 receives an indication that a chunk of data 131 is to be transferred from a first graphics processing unit (GPU) memory arena to a second GPU memory arena (act 410). The transfer determining module 115 determines that for the data chunk to be transferred from the first GPU memory arena to the second GPU memory arena, the data chunk is to be transferred from the first GPU memory arena (e.g. 135) to a central processing unit (CPU) memory arena (e.g. 140), and from the CPU memory arena to the second GPU memory arena (e.g. 145) (act 420).

The data dividing module 120 then divides the data chunk 131 into a plurality of smaller data portions (act 430), and the data copying module 125 copies the first data portion 137 from the first GPU memory arena to the CPU memory arena (act 440). The data copying module 125 then performs the following in parallel (act 450): copies the first data portion from the CPU memory arena to the second GPU memory arena (act 450A) and copies the second data portion from the first GPU memory arena to the CPU memory arena (act 450B). Thus, as in the example above, data is transferred in a pipeline fashion between heterogeneous memory arenas (in this case, between a CPU and a GPU). While transfers between two or three memory arenas are described herein with respect to methods 200, 300 and 400, it should be understood that transfers between substantially any number of memory arenas are contemplated, and that the techniques described herein would apply using any number of different memory arenas.

Accordingly, methods, systems and computer program products are provided which optimize data transfers between heterogeneous memory arenas. These heterogeneous memory arenas may be in different computing systems or within the same computing system. Pipelining data transfers increase transfer throughput and decrease transfer latency when set up and applied as described herein.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:
1. A computer system comprising the following:
one or more processors;
system memory;
one or more memory arenas accessible to at least one of the one or more processors;
one or more computer-readable storage media having stored thereon computer-executable instructions that, when executed by the one or more processors, causes the computing system to perform a method for optimizing data transfers between heterogeneous memory arenas, the method comprising the following:
receiving an indication that a chunk of data is to be transferred from a first memory arena to a third memory arena;
determining that for the data chunk to be transferred from the first memory arena to the third arena, the data chunk is to be transferred from the first memory arena to at least a second memory arena, and from the second memory arena to the third memory arena;
calculating a portion size that is calculated to minimize a total transfer time for the chunk of data from the first memory arena to the third memory arena, wherein the calculation of the portion size is based at least in part upon a total size of data transfer, a first transfer bandwidth for data copies from the first memory arena to the second memory arena, and a second transfer bandwidth for data copies from the second memory arena to the third memory arena;
dividing the data chunk into a plurality of portions according to the determined portion size for the data transfer;
copying a first data portion from the first memory arena to the second memory arena; and
performing the following in parallel:
copying the first data portion from the second memory arena to the third memory arena; and
copying a second data portion from the first memory arena to the second memory arena.

2. The computer system of claim 1, wherein one or more hardware-related data transfer characteristics of memory arenas involved in the data transfer are selected from a group consisting of transfer bandwidth of the first memory arena, transfer bandwidth of the second memory arena, transfer bandwidth of the third memory arena, fixed overhead time for the first memory arena to perform the data transfer, fixed overhead time for the second memory arena to perform the data transfer, and fixed overhead time for the third memory arena to perform the data transfer.

3. The computer system of claim 1, wherein the first memory arena comprises a source accelerator memory arena, the second memory arena comprises a CPU memory arena, and the third memory arena comprises a destination accelerator memory arena, such that the data portions are transferred from the source accelerator memory to the CPU and then to the destination accelerator memory.

4. The computer system of claim 3, wherein the parallel acts of copying the first data portion from the second memory arena to the third memory arena and copying the second data portion from the first memory arena to the second memory arena are each performed by independent direct memory access (DMA) engines.

5. The computer system of claim 4, wherein the act of copying the first data portion from the second memory arena to the third memory arena is performed by a source accelerator DMA engine, and wherein the act of copying the second data portion from the first memory arena to the second memory arena is performed by a destination accelerator DMA copy engine, such that the independent DMA engines process the data transfer concurrently.

6. The computer system of claim 1, wherein the data chunk is divided into a plurality of smaller data portions using a specified algorithm that minimizes net transfer time between memory arenas.

7. The computer system of claim 6, further comprising:
an act of determining that N number of intermediate processing resources are configured for transferring data between memory arenas;
an act of determining that the smaller data portions resulting from the specified algorithm are to be transferred between the first and third memory arenas; and
an act of increasing the data transfer throughput between the first and third memory arenas by N times using the intermediate processing resources.

8. The computer system of claim 1, further comprising an act of determining that the data chunk is to be transferred from a first memory arena to a fourth memory arena.

9. The computer system of claim 8, further comprising an act of determining that for the data chunk to be transferred from the first memory arena to the fourth arena, the data chunk is to be transferred from the first memory arena to a second memory arena, from a second memory arena to a third memory arena, and from the third memory arena to the fourth memory arena.

10. The computer system of claim 9, further comprising performing the following in parallel:
an act of copying a third data portion from the first memory arena to the second memory arena;
an act of copying the second data portion from the second memory arena to the third memory arena; and
an act of copying the first data portion from the third memory arena to the fourth memory arena.

11. A computer system comprising the following:
one or more processors;
system memory;
one or more memory arenas accessible to at least one of the one or more processors;
one or more computer-readable storage media having stored thereon computer-executable instructions that, when executed by the one or more processors, causes the computing system to perform a method for optimizing data transfers between heterogeneous memory arenas, the method comprising the following:
receiving an indication that a chunk of data is to be transferred from a central processing unit (CPU) memory arena to a graphics processing unit (GPU) memory arena;
determining that for the data chunk to be transferred from the CPU memory arena to the GPU memory arena, the data chunk is to be transferred from a first CPU memory arena to a second CPU memory arena, and from the second CPU memory arena to the GPU memory arena;
calculating a portion size that is calculated to minimize a total transfer time for the chunk of data from the first CPU memory arena to the GPU memory arena, wherein the calculation is based at least in part upon a total size of data transfer, a first transfer bandwidth for data copies from the first CPU memory arena to the second CPU memory arena, and a second transfer bandwidth for data copies from the second CPU memory arena to the GPU memory arena;

dividing the data chunk into a plurality of portions according to the determined portion size for the data transfer;

copying a first data portion from the first CPU memory arena to the second CPU memory arena; and performing the following in parallel:
copying the first data portion from the second CPU memory arena to the GPU memory arena; and
copying a second data portion from the first CPU memory arena to the second CPU memory arena.

12. The computer system of claim 11, further comprising an act of copying the second data portion from the second CPU memory arena to the GPU memory arena.

13. The computer system of claim 11, wherein the data chunk comprises a first data chunk in a stream of data chunks that is transferred from the CPU memory arena to the GPU memory arena.

14. The computer system of claim 13, wherein one or more hardware-related data transfer characteristics of memory arenas involved in the data transfer are selected from a group consisting of transfer bandwidth of the first CPU memory arena, transfer bandwidth of the second CPU memory arena, transfer bandwidth of the GPU memory arena, fixed overhead time for the first CPU memory arena to perform the data transfer, fixed overhead time for the second CPU memory arena to perform the data transfer, and fixed overhead time for the GPU memory arena to perform the data transfer.

15. The computer system of claim 11, wherein the data chunk is transferred from a first CPU memory arena to a second CPU memory arena and then to the GPU memory arena.

16. A computer system comprising the following:
one or more processors;
system memory;
one or more memory arenas accessible to at least one of the one or more processors;
one or more computer-readable storage media having stored thereon computer-executable instructions that, when executed by the one or more processors, causes the computing system to perform a method for optimizing data transfers between heterogeneous memory arenas, the method comprising the following:

receiving an indication that a chunk of data is to be transferred from a first graphics processing unit (GPU) memory arena to a second GPU memory arena;

determining that for the data chunk to be transferred from the first GPU memory arena to the second GPU memory arena, the data chunk is to be transferred from the first GPU memory arena to a central processing unit (CPU) memory arena, and from the CPU memory arena to the second GPU memory arena;

calculating a portion size that is calculated to minimize a total transfer time for the chunk of data from the first GPU memory arena to the second GPU memory arena, wherein the calculation is based at least in part upon a total size of the data transfer, a first transfer bandwidth for data copies from the first GPU memory arena to the CPU memory arena, and a second transfer bandwidth for data copies from the CPU memory arena to the second GPU memory arena;

dividing the data chunk into a plurality of portions according to the determined portion size for the data transfer;

copying a first data portion from the first GPU memory arena to the CPU memory arena; and performing the following in parallel:
copying the first data portion from the CPU memory arena to the second GPU memory arena; and
copying a second data portion from the first GPU memory arena to the CPU memory arena.

17. The computer system of claim 16, further comprising an act of copying the second data portion from the CPU memory arena to the second GPU memory arena.

18. The computer system of claim 16, wherein the data chunk comprises a first data chunk in a stream of data chunks.

19. The computer system of claim 18, wherein the stream of data chunks is transferred from the first GPU memory arena to the CPU memory arena and then to the second GPU memory arena.

20. The computer system of claim 19, wherein at least a plurality of the copying steps for transferring the stream of data chunks are performed concurrently.

* * * * *